(12) United States Patent
Mishra

(10) Patent No.: US 8,863,996 B2
(45) Date of Patent: Oct. 21, 2014

(54) CONTROLLABLE MEDICINAL DOSAGE PACKAGING FOR LIQUID MEDICATION

(75) Inventor: Himanshu Mishra, Agra (IN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/395,839

(22) PCT Filed: Jul. 13, 2011

(86) PCT No.: PCT/IB2011/001646
§ 371 (c)(1),
(2), (4) Date: Mar. 13, 2012

(87) PCT Pub. No.: WO2012/160410
PCT Pub. Date: Nov. 29, 2012

(65) Prior Publication Data
US 2012/0298699 A1    Nov. 29, 2012

(30) Foreign Application Priority Data

May 26, 2011    (IN) .......................... 1519/DEL/2011

(51) Int. Cl.
| | |
|---|---|
| *G01F 11/28* | (2006.01) |
| *A61J 1/22* | (2006.01) |
| *A61J 7/00* | (2006.01) |
| *B65D 23/04* | (2006.01) |
| *G01F 11/26* | (2006.01) |

(52) U.S. Cl.
CPC *A61J 1/22* (2013.01); *A61J 7/0076* (2013.01); *B65D 23/04* (2013.01); *G01F 11/26* (2013.01)
USPC ...................................... 222/424.5; 222/133

(58) Field of Classification Search
CPC ......... G01F 11/26; G01F 11/28; B65D 23/04; A61J 1/22; A61J 7/0076
USPC ........ 222/424.5, 427, 442, 447, 142.9, 142.8, 222/142.5, 142.6, 142.2, 425.5, 144.5, 144, 222/450–456, 425, 142.1, 133, 144.45, 222/430–438, 457.5; 220/253
See application file for complete search history.

(56) References Cited

U.S. PATENT DOCUMENTS 3,850,347 A    11/1974 Hill
4,071,171 A *  1/1978 Bassignani .................. 222/305

(Continued)

FOREIGN PATENT DOCUMENTS

WO    WO 03/093773 A1    11/2003

OTHER PUBLICATIONS

International Search Report and Written Opinion for PCT/IB2011/001646, mailed Nov. 15, 2011.

(Continued)

*Primary Examiner* — Lien Ngo
(74) *Attorney, Agent, or Firm* — Foley & Lardner LLP

(57) ABSTRACT

A storage device includes a storage chamber, a dispensing chamber, an intermediate chamber, a first channel, and a second channel. The intermediate chamber adjusts relative to the storage chamber to select a predetermined amount of fluid to flow into the intermediate chamber from the storage chamber. The first channel is located between the storage chamber and the intermediate chamber having at least two interchangeable conformations, a first open conformation to allow fluid flow between the storage chamber and the intermediate chamber, and a first closed conformation to prevent fluid flow between the storage chamber and intermediate chamber. The second channel is located between the intermediate chamber and the dispensing chamber having at least two interchangeable conformations, a second open conformation to allow fluid flow between the intermediate chamber and the dispensing chamber, and a second closed conformation to prevent fluid flow between the intermediate chamber and dispensing chamber.

24 Claims, 11 Drawing Sheets

(56) References Cited

U.S. PATENT DOCUMENTS

| | | | | |
|---|---|---|---|---|
| 4,579,256 | A | | 4/1986 | Heimlich |
| 4,807,785 | A | * | 2/1989 | Pritchett .................... 222/442 |
| 4,900,305 | A | | 2/1990 | Smith et al. |
| 5,300,042 | A | | 4/1994 | Kossoff et al. |
| 5,495,962 | A | * | 3/1996 | Nomura ...................... 222/80 |
| 5,988,434 | A | * | 11/1999 | Keil et al. ...................... 222/1 |
| 6,227,418 | B1 | * | 5/2001 | Loertscher .................. 222/438 |
| 6,249,717 | B1 | | 6/2001 | Nicholson et al. |
| 6,412,670 | B1 | * | 7/2002 | Randmae et al. ............. 222/452 |
| 6,550,640 | B2 | * | 4/2003 | Smith ............................ 222/1 |
| 8,210,187 | B1 | * | 7/2012 | Zhang ......................... 132/299 |
| 8,499,968 | B2 | * | 8/2013 | Aviram .......................... 222/1 |
| 2003/0209572 | A1 | * | 11/2003 | Myers ......................... 222/452 |
| 2007/0000953 | A1 | | 1/2007 | Ranney |
| 2012/0280000 | A1 | * | 11/2012 | Attie et al. ................... 222/452 |

OTHER PUBLICATIONS

Philip J Schneider et al. "Impact of Medication Packaging on Adherence and Treatment Outcomes in Older Ambulatory Patients,", Journal of American Pharmacists Association, Jan./Feb. 2008 48:1, pp. 58-63.

Ted Lithgow, "Unit-Dose Packaging Helps Improve Adherence," Chain Drug Review, May 25, 2009, http://findarticles.com/p/articles/mi_hb3007/is_9_31/ai_n31947704/?tag=content;col. 1.

"Just a Spoonful of Medicine? Not so Fast . . . ," Healthcare Packaging, Jan. 19, 2010, http://www.healthcarepackaging.com/archives/2010/01/just_a_spoonful_of_medicine_no.php.

Xavier Tello, "Improving Patient Compliance, an Impressive Challenge and a Costly Task," Strat-Cons Blog, http://blogs.strat-cons.com/?p=1475 patient compliance interventions, Feb. 28, 2009.

Nancy St. Laurent, "Packaging Design Innovations and Challenges,", Packaging Design Innovations and Challenges Pharmaceutical Processing, http://www.pharmpro.com/archives/2006/05/packaging-design-innovations-and-challenges/, May 2, 2006.

Bob Swientek, Respect Your Elders-Packaging Designs for the Elderly, Prepared Foods, Feb. 1996, http://findarticles.com/p/articles/mi_m3289/is_n2_v165/ai_18112798/.

"Less Mess and Less Fuss with FMP's Innovative New Medicine 'Tube Sachets'", Holistic Sales Marketing, Jan. 24, 2010, http://www.free-press-release.com/news/print-1264342863.html.

"Target Turns Old Pill Bottle Design on Its Head," http://www.msnbc.msn.com/id/7634269, Apr. 26, 2005.

Listing of all Medication Adherence Devices in the Market, http://www.patientcompliance.net, Dec. 2, 2011.

"Drugs: 'Packaging for Seniors Will Be a High-Priority Topic for the Future,'", Medica.de, http://medica.de/cipp/md_medica/custorn/pub/content,lanq,2/oid,27710/ticket,g_u_e_s_t/local_lang,2⁻/%E%80%9CP . . . , Feb. 24, 2009.

Senior-Friendly Packaging: Its All in the Mind: Designing a Package That Older Consumers Can Use Easily Means Using Your Head-and Allowing Seniors to Use Theirs. (Innovations: Older Consumers), Food & Drug Packaging, http://goliath.ecnext.com/coms2/gi_0199-1925424/Senior-friendly-packaqing-its-all_.html, Jul. 1, 2002.

"Amcor Flexibles Awarded 2008 Flexible Packaging Achievement Award for SafeStick Package Design,", Amcor Flexibles, http://www.pharmaceuticalonline.com/article.mvc/amcor--flexibles-awarded-2008-flexible- . . . , Apr. 15, 2008.

"Child Resistant Packaging," Our Bureau, Pharmabiz.com, http://pharmabiz.com/NewsDetails.aspx?aid=16701&sid=21, Jan. 30, 2003.

\* cited by examiner

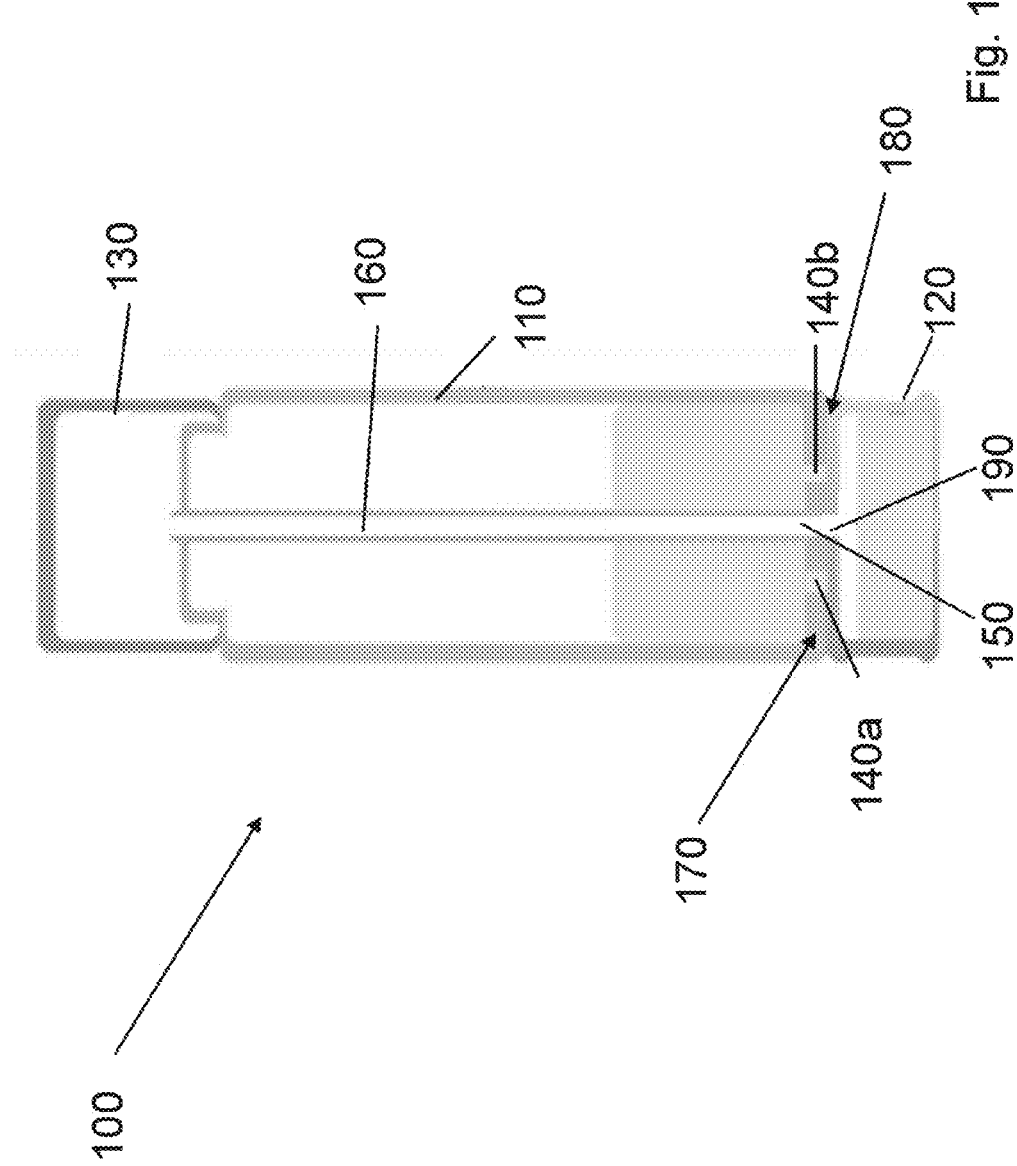

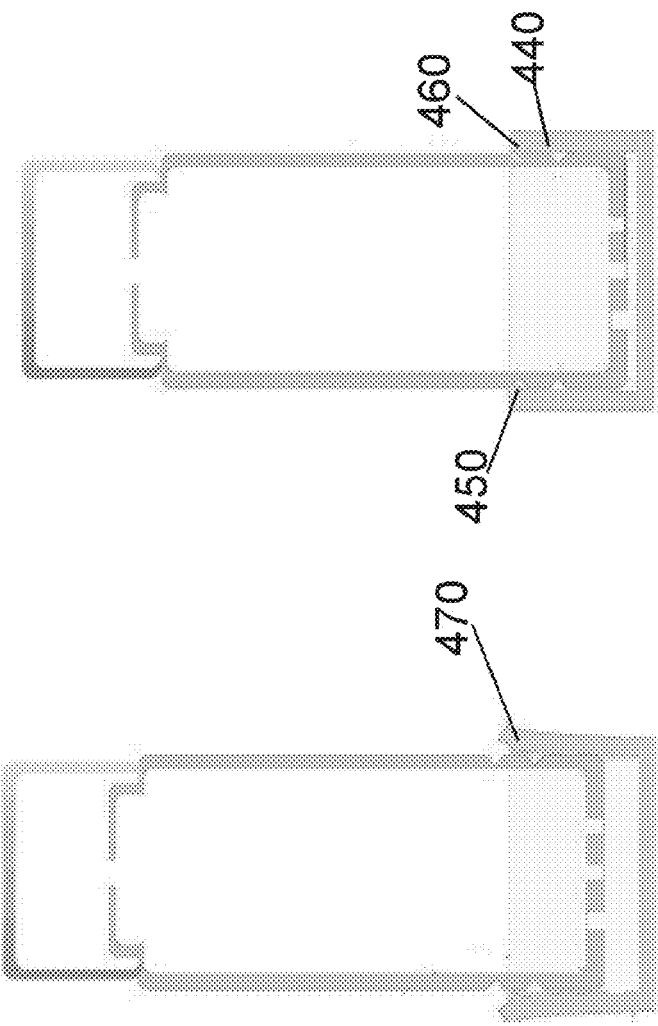

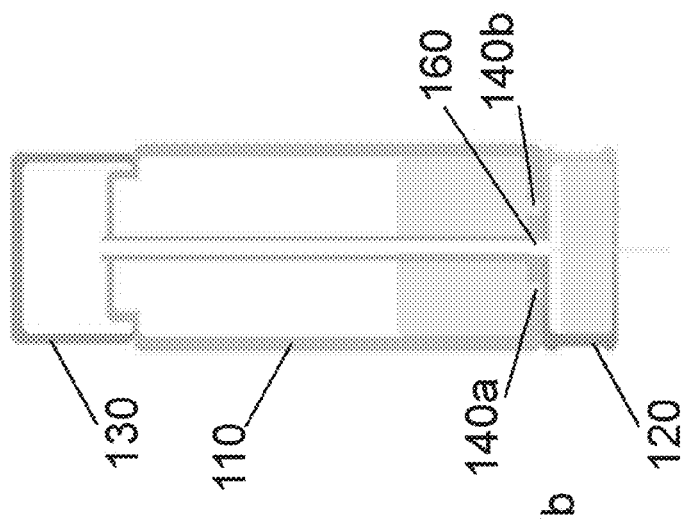
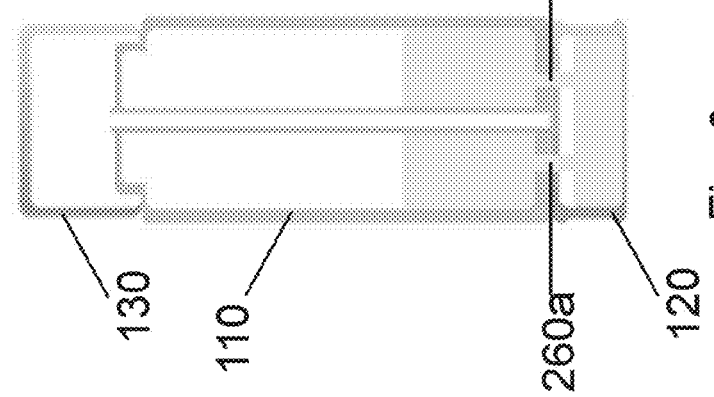
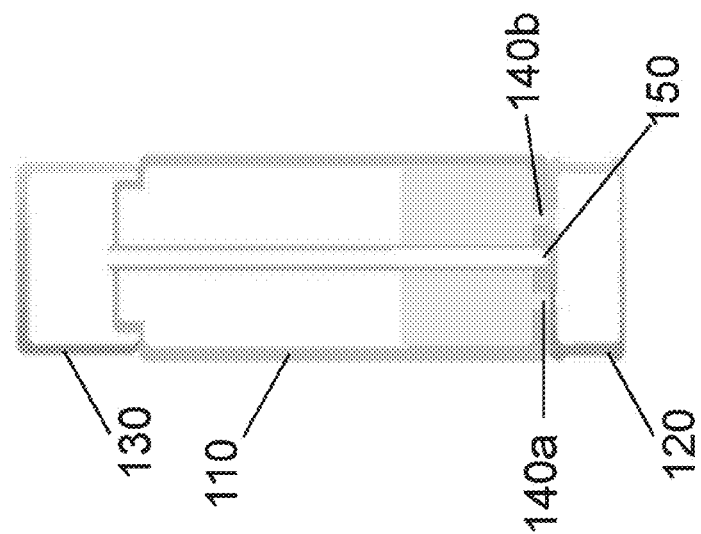

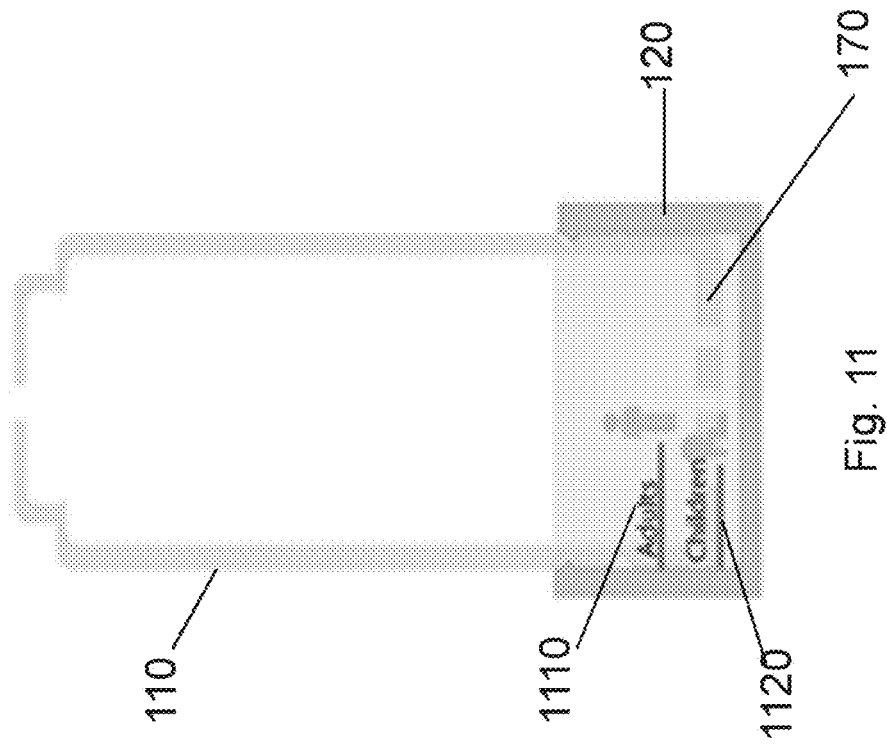

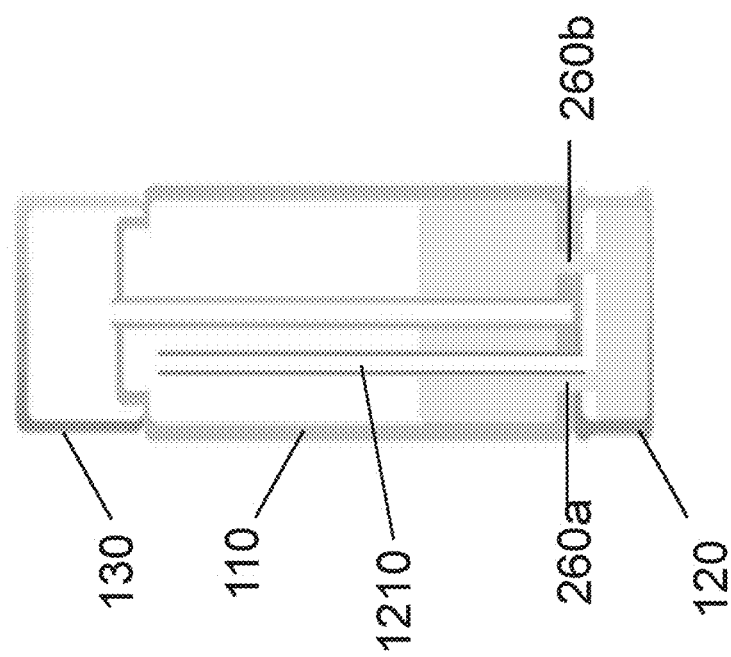

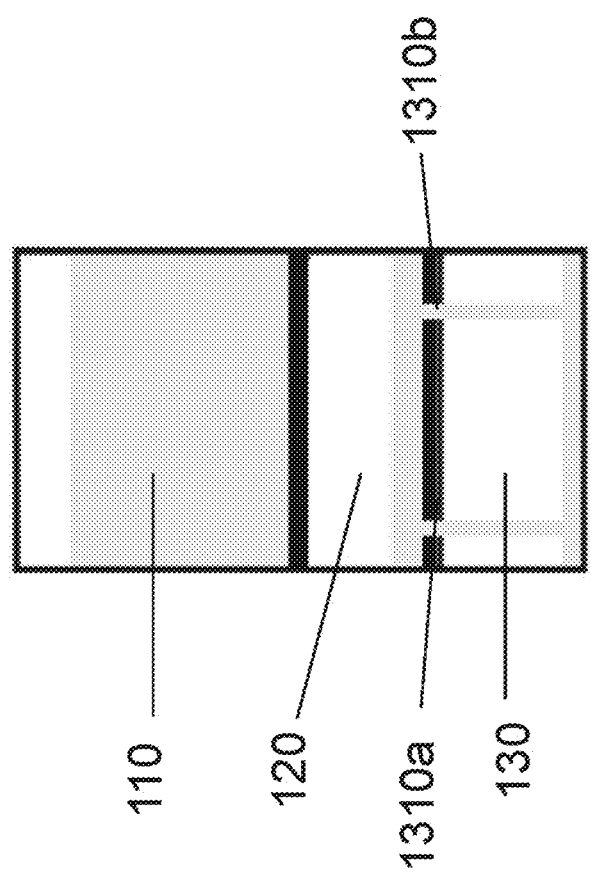

CONTROLLABLE MEDICINAL DOSAGE PACKAGING FOR LIQUID MEDICATION

CROSS-REFERENCE TO RELATED APPLICATIONS

The present application is a U.S. national stage application claiming the benefit of International Application No. PCT/IB2011/001646, filed on Jul. 13, 2011, which claims priority from Indian Patent Application No. 1519/DEL/2011, filed May 26, 2011, the entire contents of which are incorporated herein by reference in their entirety.

BACKGROUND

The following description is provided to assist the understanding of the reader. None of the information provided or references cited is admitted to be prior art.

Taking a recommended dose of a liquid medicine by a patient can involve several steps. Theft steps include opening a container, measuring the proper dosage of the liquid medicine, and taking the medication. Depending on the type of medication, it may be desirable to store the medication in a childproof container that is easy for an adult to open but difficult for children to open. However, traditional childproof medication containers are often difficult for adults to open. Specifically, conventional containers can be difficult to open by the elderly, by those with physical disabilities, by those with reduced motor controls, etc. Conventional containers also provide access to all of the medicine contained within the container once the container has been opened.

In addition to opening a container, the proper dosage of a medicine must be dispensed by the patient. Overdosing and under-dosing both lead to non-compliance with a recommended dosage, and may have ill effects on the patient. In addition, some liquid medicine packaging requires the use of measuring spoons or cups, which require that the patient have precise control while dispensing the medicine. These spoons or cups can lead to spillage of the medicine during administration and/or to contamination if the patient attempts to put unused medicine back into the container.

SUMMARY

An illustrative storage device includes a storage chamber, a dispensing chamber, an intermediate chamber, a first channel, and a second channel. The intermediate chamber is configured to adjust relative to the storage chamber to select a predetermined amount of fluid to flow into the intermediate chamber from the storage chamber. The first channel is located between the storage chamber and the intermediate chamber having at least two interchangeable conformations, a first open conformation configured to allow fluid flow between the storage chamber and the intermediate chamber, and a first closed conformation configured to prevent fluid flow between the storage chamber and intermediate chamber. The second channel is located between the intermediate chamber and the dispensing chamber having at least two interchangeable conformations, a second open conformation configured to allow fluid flow between the intermediate chamber and the dispensing chamber, and a second closed conformation configured to prevent fluid flow between the intermediate chamber and dispensing chamber.

In some embodiments, the intermediate chamber is configured to move relative to the storage chamber to select one of at least two positions, wherein in the first position the first channel is open and the second channel is closed. In some embodiments, in the second position the second channel is open and the first channel is closed. In a third position the first channel and the second channel are closed.

In some embodiments, the intermediate chamber is configured to rotate around a central axis of the storage chamber to select one of at least two positions, wherein in the first position the first channel is open and the second channel is closed. In the second position the second channel is open and the first channel is closed. In a third position the first channel and the second channel are closed.

In some embodiments, the dispensing chamber is detachable.

In some embodiments, the capacity of the intermediate chamber is a predetermined volume.

Another illustrative storage device includes a storage chamber having a first end and a second end, an intermediate chamber connected to the first end of the storage chamber, a dispensing chamber connected to the second end of the storage chamber, a first channel located between the storage chamber and the intermediate chamber, and a second channel located between the intermediate chamber and the dispensing chamber. The intermediate chamber is configured to adjust relative to the storage chamber to select a predetermined amount of fluid to flow into the intermediate chamber from the storage chamber. The first channel has at least two interchangeable conformations, a first open conformation configured to allow fluid flow between the storage chamber and the intermediate chamber, and a first closed conformation configured to prevent fluid flow between the storage chamber and intermediate chamber. The second channel has at least two interchangeable conformations, a second open conformation configured to allow fluid flow between the intermediate chamber and the dispensing chamber, and a second closed conformation configured to prevent fluid flow between the intermediate chamber and dispensing chamber wherein the second channel comprises a channel between the intermediate chamber and the dispensing chamber.

An illustrative process includes dispensing a fluid from a storage device. A first channel, located between a storage chamber and an intermediate chamber, is opened to allow fluid to flow from a storage chamber to an intermediate chamber. Fluid is prohibited, from flowing from the storage chamber into the intermediate chamber by closing the first channel. A second channel located between the intermediate chamber and a dispensing chamber is opened. The orientation of the storage device is changed, allowing fluid to flow from the intermediate chamber to the dispensing chamber.

In some embodiments, the process further includes closing the second channel to prohibit fluid from flowing from the intermediate chamber to the dispensing chamber and detaching the dispensing chamber.

In some embodiments, the process further includes adjusting the capacity of the intermediate chamber to one of a plurality of predetermined volumes.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 1 is a cross-section view of an illustrative embodiment of a liquid medicine storage device.

FIGS. 4a-4c are cross-sectional views of the liquid medicine storage device with an adjustable intermediate chamber in accordance with an illustrative embodiment.

FIG. 5 is a cross-sectional view of the liquid medicine storage device with closed channels in accordance with an illustrative embodiment.

FIG. 6 is a cross-sectional view of the liquid medicine storage device with open channels between the intermediate chamber and the storage chamber in accordance with an illustrative embodiment.

FIG. 7 is a cross-sectional view of the liquid medicine storage device with an open channel between the intermediate chamber and the dispensing chamber in accordance with an illustrative embodiment.

FIG. 11 is a cross-sectional view of the liquid medicine storage device with a volume indicator in accordance with an illustrative embodiment.

FIG. 12 is a cross-section view of a liquid medicine storage device with an air channel in accordance with an illustrative embodiment.

FIG. 13 illustrates a liquid medicine storage device where the intermediate chamber is located between the storage chamber and the dispensing chamber in accordance with an illustrative embodiment.

DETAILED DESCRIPTION

Figure 2B:
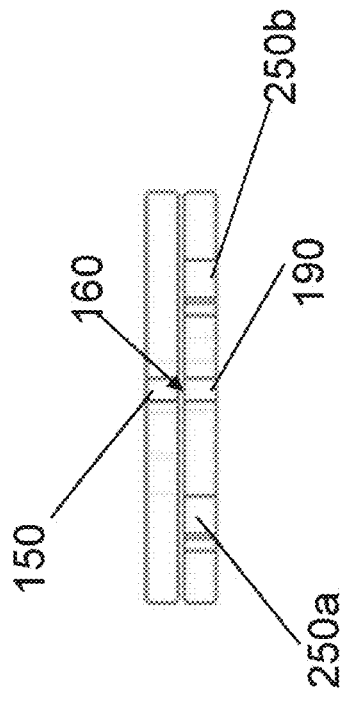
FIG. 2b is a first cross-sectional view of the interface between the storage chamber and the intermediate chamber of the liquid medicine storage device in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1 is a cross-section view of an illustrative embodiment of a liquid medicine storage device 100. Liquid medicines that can be stored in the storage device 100 include, but are not limited to, cough medicines, prescription medicines, and diarrhea medicines. The illustrative liquid medicine storage device 100 is cylindrical in shape. The storage device 100, however, is not limited to being cylindrical. The storage device 100 may be any shape such as, but not limited to, cubic or triangular. The storage device 100 can be composed of medicinal grade materials. Medicinal grade materials include, but are not limited to, copolyesters, polystyrene, polypropylene, polyvinyl chloride, and acrylic multipolymers. In the embodiment of FIG. 1, the storage device 100 may include three chambers. A storage chamber 110 stores the bulk of a medicine before the medicine is dispensed. The volume of the storage chamber 110 can depend upon the medicine that is stored in the storage chamber 110. For instance, the volume of the storage chamber 110 may depend upon the standard amount of medicine in a consumer product such that the storage chamber 110 contains a predetermined number of dosages of the medicine.

An intermediate chamber 120 can be placed into fluid communication with the storage chamber 110 to receive a dosage of the medicine from the storage chamber 110. The intermediate chamber 120 can be large enough to contain the maximum allowable dosage of the stored medicine plus an additional amount of medicine to account for any loss of medicine during the transfer from the intermediate chamber 120 to a dispensing chamber 130. In an illustrative embodiment, the intermediate chamber 120 is mounted to the storage chamber 110 such that the intermediate chamber 120 and the storage chamber 110 are able to rotate relative to one another. Rotation and placement of the intermediate chamber 120 into fluid communication with the storage chamber 110 are described in detail below. The dosage of the medicine can be an amount of the medicine appropriate for any adult patient, an amount of medicine appropriate for any child patient, an amount of the medicine prescribed for a specific patient, or any other amount of the medicine prescribed by a care provider. The patient can be a human patient or an animal patient including, but not limited to, a horse, a dog, a cat, a bird, a primate, etc.

The dispensing chamber 130 can be placed into fluid communication with the intermediate chamber 120 to receive the dosage of the medicine from the intermediate chamber 120. Accordingly, the Volume of the dispensing chamber 130 can contain a volume of medicine that corresponds with the maximum allowable dosage of the medicine. Placement of the dispensing chamber 130 into fluid communication with the intermediate chamber 120 is described in detail below. In one embodiment, the patient may ingest the dosage of the medicine directly from the dispensing chamber 130. In an alternative embodiment, the patient may place the dosage of the medicine from the dispensing chamber 130 into another receptacle such as but not limited to a cup, etc., prior to ingesting the medicine.

In one embodiment, the storage chamber 110, the intermediate chamber 120, and/or the dispensing chamber 130 may include indicators for indicating the amount of medicine in the respective chamber. FIG. 11 illustrates indicators 1110 and 1120 on the intermediate chamber 120. In this embodiment, the intermediate chamber 120 can be transparent or semi-transparent, allowing the storage chamber 110 to be visible through the intermediate chamber 120. A bottom wall 170 of the storage chamber 110 is visible through the intermediate chamber 120. The bottom wall 170 can be aligned with an adult dose indicator 1110 or a child dose indicator 1120 to select the appropriate dosage of medicine. In addition, the amount of medicine in the intermediate chamber 120 can be seen. The storage chamber 110 and the dispensing chamber 130 may also be transparent or semi-transparent allowing the amount of medicine in the respective chamber to be visible.

The illustrative examples of the storage chamber 110, intermediate chamber 120, and the dispensing chamber 130 are illustrated in FIG. 1 as having the same relative shape. The chambers 110, 120, and 130 are not limited to being the same shape and can be any shape. As a non-limiting example, the intermediate chamber 120 may be cubic in shape, while the storage chamber 110 and the dispensing chamber are cylindrical. In another non-limiting example, the storage chamber 110 is cubic, the intermediate chamber is triangular, and the dispensing chamber is cylindrical.

In an illustrative embodiment, medicine can flow from the storage chamber 110 into the intermediate chamber 120 via a pair of channels 260a and 260b of FIG. 2b. The channels can be either open or closed. Medicine is able to flow from the storage chamber 110 into the intermediate chamber 120 when channels 260a and 260b are open. Alignment of the apertures is illustrated and described with reference to FIGS. 2a, 2b, 3a, and 3b. Channels 260a and 260b are open when a pair of apertures 140a and 140b, located in a bottom wall 170 of the storage chamber 110, are aligned with another pair of apertures 250a and 250b, located in a top wall 180 of the intermediate chamber 120. When the apertures 140a and 140b are not aligned with the apertures 250a and 250b the channels 260a and 260b are closed. In an alternative embodiment, fewer or additional apertures and channels may be used. In additional, apertures can be various shapes and sizes. Non-limiting examples include apertures that are circles, squares, or other polygons. The size of the apertures 140a, 140b, 250a, and 250b can vary based upon a desired rate of flow to the various chambers of the storage device 100. The amount of medicine above an open channel will affect the rate of the medicine's flow through the open channel. As medicine within the storage chamber 110 is dispensed, the amount of medicine in the storage chamber 110 is reduced. This reduction results is less medicine being above the channels 260a and 260b. Accordingly, any desired flow rate should take into account the changes to flow rate as the amount of medicine in the storage chamber 110 is reduced.

Medicine flows from the storage chamber 110 to the intermediate chamber 120 when the channels 260a and 260b are open. The channels 260a and 260b are open when the apertures 140a and 140b of the storage chamber 110 are aligned with the apertures 250a and 250b of the intermediate chamber 120 and when the storage chamber 110 is higher in elevation than the intermediate chamber 120 (e.g., when the storage device 100 is in an upright position as illustrated with reference to FIG. 1). When the pair of apertures 140a and 140b are not aligned with the pair of apertures 250a and 250b in the top wall of the intermediate chamber 120, the flow of medicine from the storage chamber 110 to the intermediate chamber 120 is prevented. Thus, channels 260a and 260b are closed.

In the embodiment of FIG. 1, the dispensing chamber 130 is connected to an end of the storage chamber 110 opposite from the end connected to the intermediate chamber 120. In an alternative embodiment, the dispensing chamber 130 may be connected to the intermediate chamber 120. In this embodiment, a channel is formed between the intermediate chamber 120 and the dispensing chamber 130 by apertures located in a bottom wall of the intermediate chamber 120 and a top wall of the dispensing chamber 130. In the embodiment of FIG. 1, an aperture 150 in a bottom wall 170 of the storage chamber 110 is aligned with an aperture 190 in the top wall 180 of the intermediate chamber 120. The alignment of aperture 150 and aperture 190 opens channel 160. Channel 160 allows the intermediate chamber 120 to be in fluid communication with the dispensing chamber 130. As illustrated in FIG. 1 a channel 160, when open, allows the medicine to flow from the intermediate chamber 120 to the dispensing chamber 130. The medicine flows from the intermediate chamber 120 to the dispensing chamber 130 when the intermediate chamber 120 is higher in elevation than the dispensing chamber 130 (e.g., when the storage device 100 is upside down as illustrated with reference to FIG. 8) and when the aperture 150 is aligned with the aperture 190. The aperture 150 can be aligned with the aperture 190 by rotating the intermediate chamber 120 relative to the storage chamber 110 as described in more detail below.

In an illustrative embodiment, the storage device 100 is configured such that the pair of apertures 140a and 140b are not aligned with the one or more apertures in the top wall of the intermediate chamber 120 when the aperture 150 is aligned with the channel 160. That is, the storage device 100 is configured such that channels 260a and 260b are not open when channel 160 is open. Similarly, the storage device 100 is configured so that the aperture 150 is not aligned with the channel 160 when the pair of apertures 140a and 140b are aligned with the one or more apertures in the top wall of the intermediate chamber 120. As such, only the single dose of medicine from the intermediate chamber 120 is able to flow into the dispensing chamber 130 when the aperture 150 is aligned with the channel 160. Similarly, medicine from the storage chamber 110 is unable to flow into the dispensing chamber 130 as the intermediate chamber 120 is being filled with medicine.

In one embodiment, once the medicine is transferred into the dispensing chamber 130, the dispensing chamber 130 can be detached from the storage device 100 so that the patient can access and ingest the dose of medicine. A detachable dispensing chamber 930 is illustrated and described with reference to FIG. 9. In one embodiment, the detachable dispensing chamber 930 is connected to the storage chamber 110 through interlocking threads on the detachable dispensing chamber 930 and the storage chamber 110. In this embodiment, the detachable dispensing chamber 930 is detached from the storage chamber 110 by rotating the detachable dispensing chamber 930 with respect to the storage chamber 110. The detachable dispensing chamber 930 can be reattached to the storage chamber 110 by interlocking the corresponding threads and rotating the detachable dispensing chamber 930 in the opposite direction used to detach the detachable dispensing chamber 930. In another embodiment, the detachable dispensing chamber 930 includes a notch 910 around the open end of the detachable dispensing chamber 930. The notch 910 attaches to the storage chamber 110 via a corresponding slot 920. Pressing on opposite sides of the detachable dispensing chamber 930 causes the notch 910 to disengage from the slot 920. Accordingly, the detachable dispensing chamber 930 is detached from the storage chamber 110. The detachable dispensing chamber 930 can be reattached to the storage chamber 110 by fitting the notch 910 into the slot 920.

Similar to the intermediate chamber 120, the dispensing chamber 130 can include an indicator that allows the patient to determine the amount of liquid medicine in the dispensing chamber 130 and to verify that the dispensing chamber 130 includes a fill dose of the medicine. In one illustrative embodiment, the dispensing chamber 130 can include dosage markers that can be text, graphics, or other indicia that indicate the various dosages. Additionally, the dispensing chamber 130 can be transparent or semi-transparent, allowing the medicine contained in the dispensing chamber 130 to be matched against the dosage markers. In another embodiment, only a portion of the dispensing chamber 130 is transparent or semi-transparent.

In an illustrative embodiment, the storage device 100 is statically balanced and stable such that the storage device 100 can be stood on either the bottom wall of the intermediate chamber 120 or the top wall of the dispensing chamber 130. In alternative embodiments, the storage device 100 is statically balanced for each configuration that allows fluid to flow between chambers. As a result, the medicine is able to flow between chambers while the storage device 100 is resting on a surface. To further increase the stability of the storage device 100, the base of the dispensing chamber 130 and the intermediate chamber 120 can be broader than the storage chamber 110. In such a configuration, the area of the storage device 100 in contact with a horizontal surface is greater compared to an intermediate chamber 120 and dispensing chamber 130 that is the same width as the storage chamber 110, making the storage device 100 topple resistant.

In the embodiment of FIG. 1, as medicine flows from the storage chamber 110 to the intermediate chamber 120 and from the intermediate chamber 120 to the dispensing chamber 130, the patient or other user does not have direct access to the medicine stored in the storage chamber 110. The storage device 100 only allows a single dose of medicine to be dispensed via the dispensing chamber 130 at a given time. To gain access to all of the medicine in the storage chamber 110, the dispensing process can be repeated numerous times, dispensing one dose at a time, until the storage chamber is emptied. Such a process helps prevent children and/or other unauthorized users from gaining access to multiple dosages of medicine stored in the storage chamber 110. While the storage device 100 discourages children from accessing the medicine stored in the storage chamber 110, dispensing a single measured dose of medicine remains within the physical/mental abilities of most adults. Manipulation of the storage device 100, as compared to traditional medicine dispensing bottles, requires increased thought and interaction, decreasing the likelihood that a child can access the medicine.

Figure 2A:
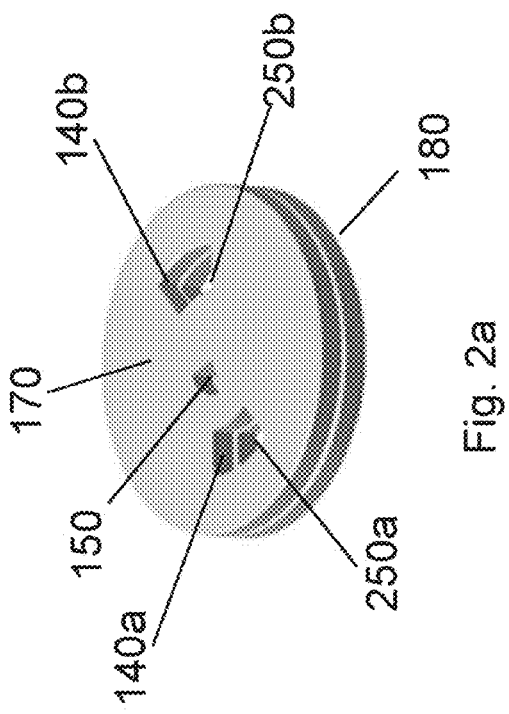
FIG. 2a is a first perspective view of an interface between a storage chamber and an intermediate chamber of the liquid medicine storage device in accordance with an illustrative embodiment.

The storage chamber 110 and the intermediate chamber 120 are able to move in a concentric manner around a central axis of the storage chamber 110. The relative movement of the intermediate chamber 120 about the storage chamber 110 allows the channels 260a, 260b, and 160 to open and close. FIG. 2a is a perspective view of a representative interface between the storage chamber and the intermediate chamber. The interface includes a bottom wall 170 of the storage chamber 110 and a top wall 180 of the intermediate chamber 120. The bottom and top designation refers to the orientation of the storage device 100 in an upright position as illustrated with reference to FIG. 1. The bottom wall 170 of the storage chamber 110 includes three apertures 140a, 140b, and 150. The top wall 180 of the intermediate chamber includes three corresponding apertures 250a, 250b, and 190. FIG. 2b illustrates a cross-section view of the representative interface illustrated in FIG. 2a. Apertures 140a, 140b, 150, 250a, 250b, and 190 are shown in FIG. 2b.

FIGS. 2a and 2b illustrate the interface in a first open position. In the first open position, the apertures 140a and 140b in the bottom wall 170 of the storage chamber 110 align with corresponding apertures 250a and 250b in the top wall 180 of the intermediate chamber 120. Thus, channels 260a and 260b are open and allow the intermediate chamber 120 to be in fluid communication with the storage chamber 110. Liquid is prohibited from flowing to the dispensing chamber in the first open position, as channel 160 is closed. Channel 160 is closed because aperture 150 is not aligned with its corresponding aperture 190 in the one end of the intermediate chamber 120.

Figure 3B:
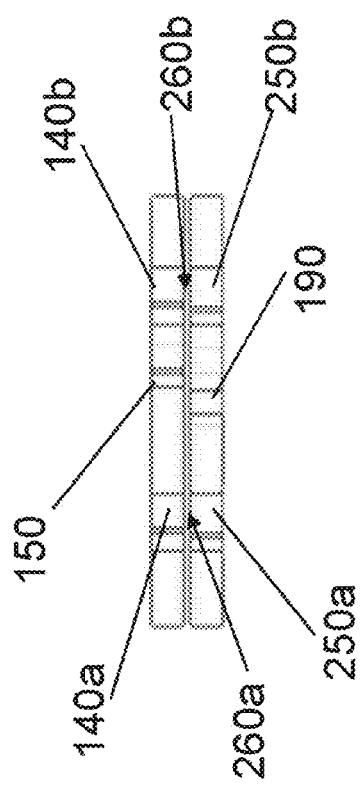
FIG. 3b is a second cross-sectional view of the interface between the storage chamber and the intermediate chamber of the liquid medicine storage device in accordance with an illustrative embodiment.
Figure 3A:
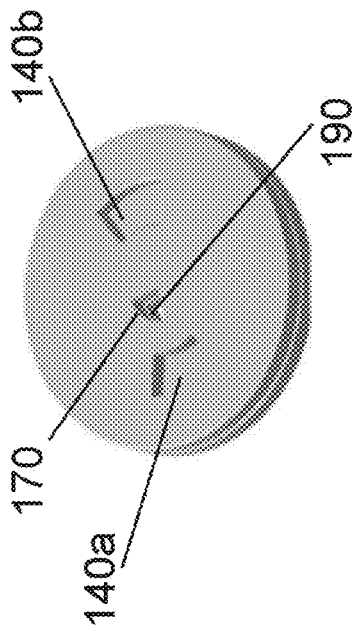
FIG. 3a is a second perspective view of the interface between the storage-chamber and the intermediate chamber of the liquid medicine storage device in accordance with an illustrative embodiment.

FIGS. 3a and 3b illustrate the interface in a second open position. In this representative embodiment, the second open position may be achieved by rotating the intermediate chamber 120 ninety degrees relative to the storage chamber 110. In alternative embodiments, angles other than 90 degrees call be used to move the storage device 100 into the second open position. For instance, rotating the intermediate chamber 120 by 45 degrees could also be used to bring the intermediate chamber 120 into fluid communication with the dispensing chamber 130. In the second open position, the aperture 150 is aligned with the aperture 190 allowing the intermediate chamber 120 to be in fluid communication with the dispensing chamber 130. Thus, channel 160 is open. In the second open position channels 260a and 260b are closed because the pair of apertures 140a and 140b are not aligned with the pair of apertures 250a and 250b. Thus, the storage chamber 110 is not in fluid communication with the intermediate chamber 120. In the second open position, channel 160 is open and channels 260a and 260b are both closed. In the second open position, fluid is allowed to flow between the intermediate chamber 120 and the dispensing chamber 130. Fluid flows through channel 160 which includes the aperture 150 and aperture 190. Fluid, however, is prohibited from flowing, from the storage chamber 110 to the intermediate chamber 120. In the second open position, apertures 140a and 140b are no longer in alignment with apertures 250a and 250b as is illustrated in FIG. 3b. Accordingly, channels 260a and 260b are closed and the storage chamber 110 is not in fluid communication with the intermediate chamber 120.

The intermediate chamber 120 may also move to a closed position, not illustrated. In the closed position, channels 260a, 260b, and 160 are all closed. None of the apertures 140a, 140b, or 150 in the bottom wall 170 of the storage chamber 110 are aligned with any of the apertures 250a, 250b, or 190 in the top wall 180 of the intermediate chamber. Thus, medicine is prevented from flowing from one chamber into any other chamber.

The volume of the intermediate chamber 120 can be adjusted to account for different dosage levels. FIGS. 4a, 4b, and 4e illustrate a representative embodiment of an intermediate chamber 420 that is adjustable between two dosages. Alternate embodiments may include any number of adjustable settings for pre-defined dosages, such as three or four different dosages. In FIG. 4a, a storage chamber 410 includes first slot 440 and a second slot 460. The intermediate chamber 420 includes a notch 450 that is configured to be inserted into either the first slot 440 or the second slot 460. When the notch 450 of the intermediate chamber 420 is inserted into the first slot 440, the volume of the intermediate chamber 420 corresponds to a first dosage. The first dosage corresponds to a pre-defined volume related to the medicine in the storage device 400. Changing from the first dosage to a second dosage is achieved by moving the intermediate chamber 420 from the first slot 440 to the second slot 460. The intermediate chamber 420 includes a flexible end 470 that allow the intermediate chamber 420 to be easily removed from the first slot 440. A non-limiting example of a flexible end 470 is an annular snap. The materials, process, and tools for creating annular snaps are well known to those of skill in the art. Once the notch 450 is freed from the first slot 440, the intermediate chamber 420 can slide up the storage chamber 410, allowing the notch 450 to be inserted into the second slot 460. FIG. 4c illustrates the intermediate chamber 420 adjusted to a second dosage. Inserting the notch 450 into the second slot 460 decreases the volume of the intermediate chamber 420. In one configuration, the first dosage corresponds to an adult dosage and the second dosage corresponds to a child dosage.

In another illustrative embodiment, the intermediate chamber 120 and the storage chamber 110 include threads that are mated. The mated threads allow the intermediate chamber 120 to move relative to the storage chamber 110. As the bottom wall of the intermediate chamber 120 comes closer to the bottom wall of the storage chamber 110, the volume of medicine that may be contained in the intermediate chamber 120 is reduced. Conversely, as the bottom wall of the intermediate chamber 120 moves away from the bottom wall of the storage chamber 110, the volume of the intermediate chamber 120 increases.

In yet another illustrative embodiment, the intermediate chamber 120 includes multiple telescopic cylinders. The cylinders can telescope to decrease the volume of the intermediate chamber 120. The volume of the intermediate chamber 120 can also be increased by expanding the telescopic cylinders. The process and tools for creating telescopic cylinders are well known to those of skill in the art.

The volume of the intermediate chamber 120 may be increased to account for the viscosity of the medication and the path that the medication traverses before being dispensed. As medicine flows from the storage chamber 110 to the intermediate chamber 120 and finally to the dispensing chamber 130, some of the medicine will stick to the walls of the various chambers and channel 160. Accordingly, the volume of the intermediate chamber 120 may be greater than the volume of a pre-defined dosage to account for medicine that does not flow completely to the dispensing chamber 130.

Figure 9:
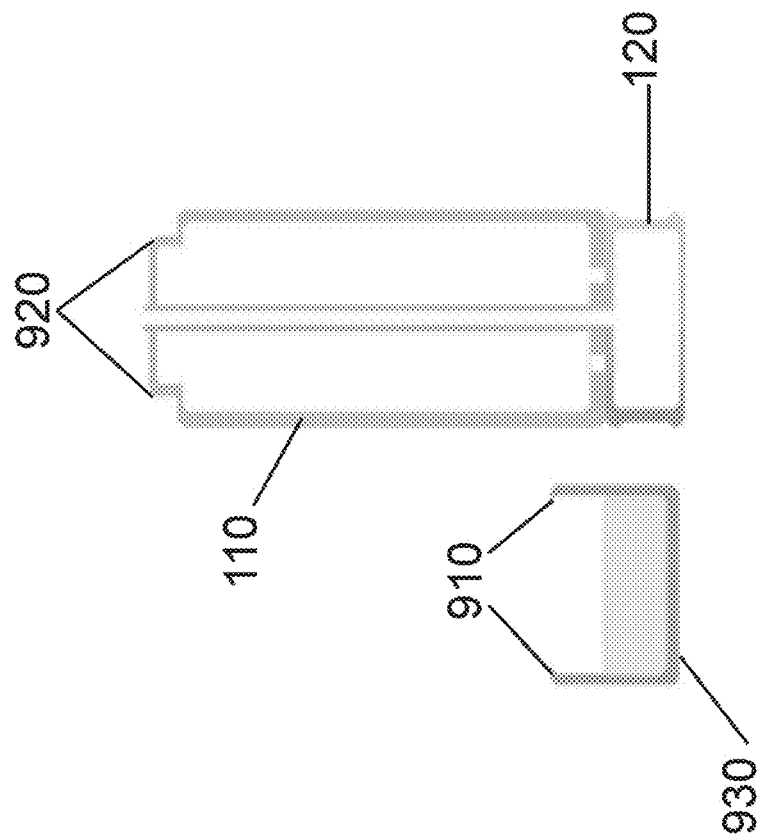
FIG. 9 is a cross-sectional view of the liquid medicine storage device with a detachable dispensing chamber in accordance with an illustrative embodiment.
Figure 8:
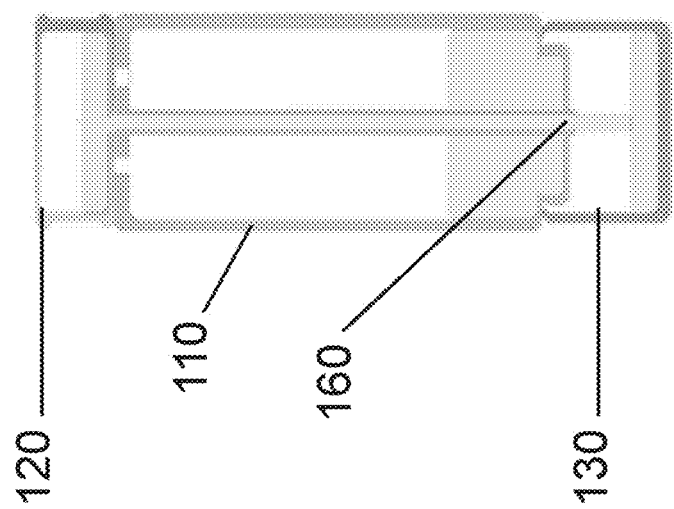
FIG. 8 is a cross-sectional view of an inverted liquid medicine storage device in accordance with an illustrative embodiment.
Figure 10:
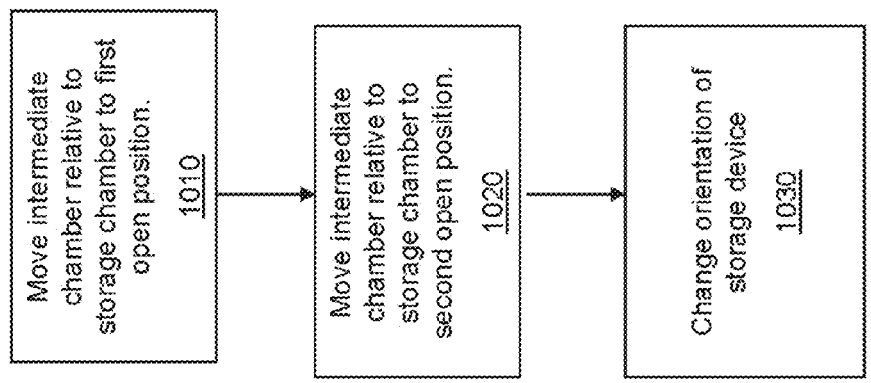
FIG. 10 is a flow diagram depicting operations performed in dispensing a controlled dose of a liquid medication in accordance with an illustrative embodiment.

FIGS. 5 through 9 illustrate the storage device 100 dispensing a medicine according to the operations depicted in FIG. 10. In FIG. 5, the medicine is stored in the storage chamber 110. Channels 260a, 260b, and 160 (shown in FIGS. 6 and 7) are not open and therefore, the intermediate chamber 120 is not in fluid communication with either the storage chamber 110 or the dispensing chamber 130. Thus, the pair of apertures 140a and 140b is not aligned with the pair of apertures 250a and 250b (not shown) and the aperture 150 is not aligned with the aperture 190 (not shown). Medicine, therefore, is prevented from flowing from the storage chamber 110 to the intermediate chamber 120 and from the intermediate chamber 120 to the dispensing chamber 130. In an operation 1010, the intermediate chamber 120 is moved relative to the storage chamber 110 to the first open position. In the first open position channels 260a and 260b are open. Channels 260a and 260b open when the pair of apertures 140a and 140b in the bottom wall 170 of the storage chamber 110 are aligned with apertures 250a and 250b in the top wall 180 of the intermediate chamber 120. Such an alignment puts the storage chamber 110 in fluid communication with the intermediate chamber 120. This allows medicine to flow from the storage chamber 110 into the intermediate chamber 120, which is located below the storage chamber 110, as illustrated in FIG. 6. After the intermediate chamber 120 fills with medicine, the intermediate chamber 120 is rotated about the storage chamber in an operation 1020. This movement causes the channels 260a and 260b to close. The channels 260a and 260b are closed when the pair of apertures 140a and 140b are no longer aligned with apertures 250a and 250b. Thus, the fluid communication between the storage chamber 110 and the intermediate chamber is severed. As illustrated in FIG. 7, channel 160 is open. The channel 160 is open when aperture 150 in the bottom wall 170 of the storage chamber 110 is aligned with the aperture 190 in the top wall 180 of the immediate chamber 120. In an operation 1030, the orientation of the storage device 100 is changed, whereby the intermediate chamber 120 is positioned above the dispensing chamber 130. Changing of the orientation can include, but is not limited to, partially or fully inverting the storage device 100. Medicine then flows from the intermediate chamber 120 through the channel 160 into the dispensing chamber 130 via the channel 160, as illustrated in FIG. 8. Once the dispensing chamber 130 contains the dosage of medicine, the dispensing chamber 130 can be removed from the storage device 100 as illustrated in FIG. 9. Thus, dispensing of a precise dosage of medicine is achieved with physical ease. Accordingly, the elderly and those with physical disabilities can dispense a precise dose of medicine. Further, the storage device 100 remains difficult for children to gain access to the stored medicine based upon the cognitive barrier of the steps involved in gaining access to the stored medicine.

FIG. 12 is a cross-section view of a liquid medicine storage device with an air channel in accordance with an illustrative embodiment. To ensure adequate flow between the chambers (e.g. for high viscosity medicines), an air channel 1210 can be added between the storage chamber 110 and the intermediate chamber 120. As liquid flows from the stomp chamber 110 into the intermediate chamber 120, air from the intermediate chamber 120 flows into the storage chamber 110 via the air channel 1210. The air channel 1210 allows pressure stabilization between the two chambers, and ensures flow between the chambers by preventing a buildup of pressure in the intermediate chamber 120. In addition, an air channel can be added between the intermediate chamber 120 and the dispensing chamber 130. Additionally, maximizing the size of channels 260a, 260b, and 160 increases the rate of flow of the medicine between the various chambers.

The relative positions of the storage chamber 110, intermediate chamber 120, and the dispensing chamber 130 are not limited to the positions illustrated in FIG. 1. FIG. 13 illustrates a liquid medicine storage device 100 where the intermediate chamber 120 is located between the storage chamber 110 and the dispensing chamber 130. Liquid can flow between the storage chamber 110 and the intermediate chamber 120 in a similar manner as described above. Liquid in the intermediate chamber 120 can flow into the dispensing chamber 130 through channels 1310a and 1310b. The channels 1310a and 1310b can be opened and closed by moving the intermediate chamber 120 in relation to the dispensing chamber 130 or vice versa.

Figure 14B:
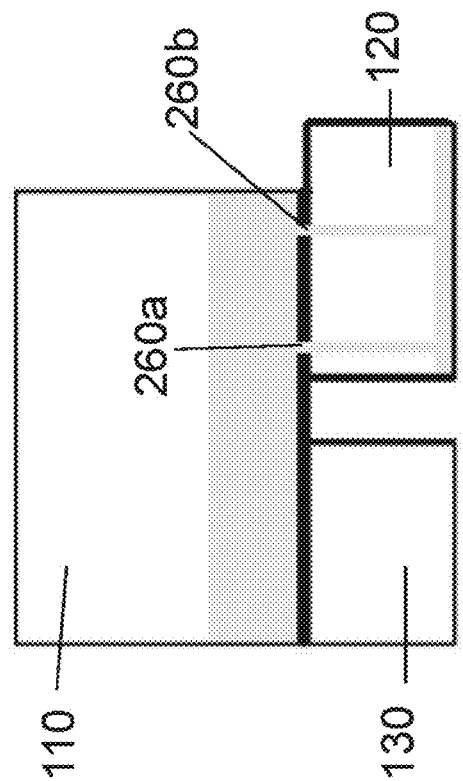
FIGS. 14a-14c illustrate a liquid medicine storage device where the channels between the storage chamber and the intermediate chamber are located on a separate axis from the channels between the intermediate chamber and the dispensing chamber in accordance with an illustrative embodiment.
Figure 14A:
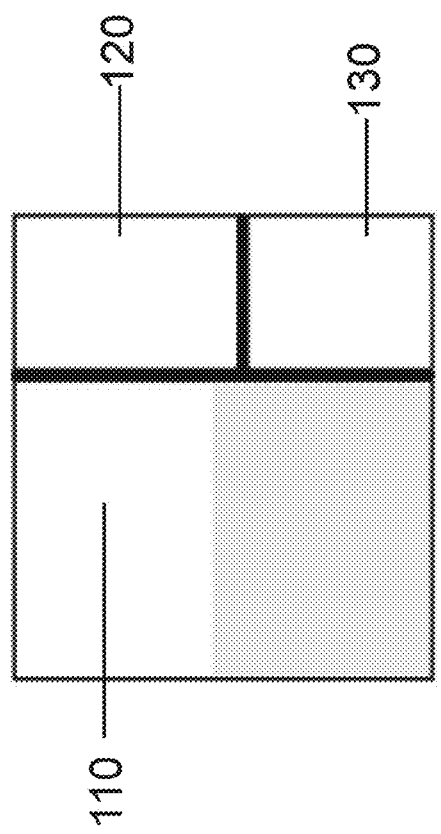
Figure 14C:
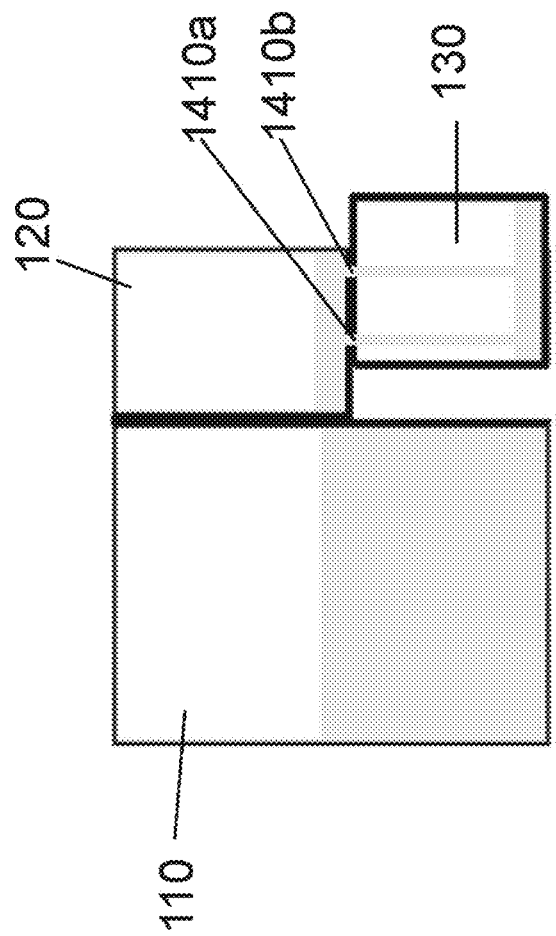

In addition, FIG. 14a illustrates a liquid medicine storage device 100 where the channel or channels between the storage chamber 110 and the intermediate chamber 120 are located on a separate axis from the channel or channels between the intermediate chamber 120 and the dispensing chamber 130. FIG. 14b illustrates the storage device 100 rotated such that the intermediate chamber 120 is below the storage chamber 110. Channels 260a and 260b allow liquid to flow from the storage chamber 110 into the intermediate chamber 120. The channels 260a and 260b are opened by moving the intermediate chamber 120 parallel with the storage chamber 110 and away from the dispensing chamber 130. Alternatively, the storage chamber 110 can be moved parallel to the intermediate chamber 120 and the dispensing chamber 130 to open the channel or channels between the storage chamber 110 and the intermediate chamber 120. Moving the intermediate chamber 120 back to its original position can close the channel or channels between the intermediate chamber 120 and the storage chamber 110. FIG. 14c illustrates the storage device 100 moved such that the dispensing chamber 130 is below the intermediate chamber 120. Liquid in the intermediate chamber 120 can flow into the dispensing chamber 130 via channels 1410a and 1410b. The channels 1410a and 1410b can be opened by moving the storage chamber 130 parallel to the intermediate chamber 120 and away from the storage chamber 110. Moving the dispensing chamber 130 back to its original position closes channels 1410a and 1410b. In an alternative embodiment, the intermediate chamber 120 can be moved parallel to the dispensing chamber 130 and away from the storage chamber 110 to open the channels 1410a and 1410b. FIG. 14c illustrates two channels 1410a and 1410b between the intermediate chamber 120 and the dispensing chamber 130, other number of channels, however, can be used such as but not limited to, a single channel, three channels, five channels, etc.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architect ate merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the tam "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A storage device comprising:
   a storage chamber;
   a dispensing chamber;
   an intermediate chamber, wherein the intermediate chamber is configured to adjust relative to the storage chamber to select a predetermined volume of liquid from a plurality of predetermined volumes of liquid to flow into the intermediate chamber from the storage chamber;
   a first channel located between the storage chamber and the intermediate chamber having at least two interchangeable conformations, a first open conformation configured to allow liquid flow between the storage chamber and the intermediate chamber, and a first closed conformation configured to prevent liquid flow between the storage chamber and the intermediate chamber; and
   a second channel located between the intermediate chamber and the dispensing chamber having at least two interchangeable conformations, a second open conformation configured to allow liquid flow between the intermediate chamber and the dispensing chamber, and a second closed conformation configured to prevent liquid flow between the intermediate chamber and the dispensing chamber, wherein at least a portion of the second channel is located within the storage chamber.

2. The storage device of claim 1, wherein the intermediate chamber is configured to move relative to the storage chamber to select one of at least two positions, wherein in the first position the first channel is open and the second channel is closed.

3. The storage device of claim 2, wherein in the second position the second channel is open and the first channel is closed.

4. The storage device of claim 3, wherein in a third position the first channel and the second channel are closed.

5. The storage device of claim 1, wherein the intermediate chamber is configured to rotate around a central axis of the storage chamber to select one of at least two positions, wherein in the first position the first channel is open and the second channel is closed.

6. The storage device of claim 5, wherein in the second position the second channel is open and the first channel is closed.

7. The storage device of claim 6, wherein in a third position the first channel and the second channel are closed.

8. The storage device of claim 1, wherein the dispensing chamber is detachable.

9. The storage device of claim 1, further comprising a first air channel configured to allow air flow between the storage chamber and the intermediate chamber.

10. The storage device of claim 9, further comprising a second air channel configured to allow air flow between the intermediate chamber and the dispensing chamber.

11. A storage device comprising:
a storage chamber having a first end and a second end;
an intermediate chamber connected to the first end of the storage chamber, wherein the intermediate chamber is configured to adjust relative to the storage chamber to select a predetermined volume of liquid to flow into the intermediate chamber from the storage chamber;
a dispensing chamber connected to the second end of the storage chamber and configured to move relative to the storage chamber to open a second channel;
a first channel located between the storage chamber and the intermediate chamber having at least two interchangeable conformations, a first open conformation configured to allow liquid flow between the storage chamber and the intermediate chamber, and a first closed conformation configured to prevent liquid flow between the storage chamber and the intermediate chamber; and
the second channel located between the intermediate chamber and the dispensing chamber having at least two interchangeable conformations, a second open conformation configured to allow liquid flow between the intermediate chamber and the dispensing chamber, and a second closed conformation configured to prevent liquid flow between the intermediate chamber and the dispensing chamber wherein the second channel comprises a channel between the intermediate chamber and the dispensing chamber, wherein at least a portion of the second channel is located within the storage chamber.

12. The storage device of claim 11, wherein the intermediate chamber is configured to move relative to the storage chamber to select one of at least two positions, wherein in the first position the first channel is open and the second channel is closed.

13. The storage device of claim 12, wherein in the second position the second channel is open and the first channel is closed.

14. The storage device of claim 13, wherein in a third position the first channel and the second channel are closed.

15. The storage device of claim 11, wherein the intermediate chamber is configured to move relative to the storage chamber to select one of at least two positions, wherein in the first position the first channel is open and the second channel is closed.

16. The storage device of claim 15, wherein in the second position the second channel is open and the first channel is closed.

17. The storage device of claim 16, wherein in a third position the first channel and the second channel are closed.

18. The storage device of claim 11, wherein the dispensing chamber is detachable.

19. A method comprising:
adjusting a capacity of an intermediate chamber to one of a plurality of predetermined volumes;
opening a first channel located between a the storage chamber and the intermediate chamber, wherein a storage device comprises the storage chamber, the intermediate chamber, and a dispensing chamber, and wherein opening the first channel allows liquid to flow from the storage chamber to the intermediate chamber;
closing the first channel, wherein closing the first channel prohibits liquid from flowing from the storage chamber to the intermediate chamber;
opening a second channel located between the intermediate chamber and the dispensing chamber, wherein opening the second channel allows liquid to flow from the intermediate chamber to the dispensing chamber, wherein at least a portion of the second channel is located within the storage chamber; and
changing an orientation of the storage device to permit liquid to flow from the intermediate chamber to the storage chamber.

20. The method of claim 19, further comprising:
closing the second channel, wherein closing the second channel prohibits liquid from flowing from the intermediate chamber to the dispensing chamber;
detaching the dispensing chamber.

21. The method of claim 19, wherein the opening the first channel comprises rotating an intermediate chamber around a central axis of a storage chamber to open the first channel, and wherein the opening the second channel comprises rotating the intermediate chamber around the central axis of the storage chamber to open the second channel.

22. The method of claim 19, wherein the liquid is a medicine, wherein a first predetermined volume of liquid corresponds to an adult dosage, and wherein a second predetermined volume of liquid corresponds to a child dosage.

23. The storage device of claim 1, wherein the storage chamber comprises multiple slots, wherein the intermediate chamber comprises a notch configured to be inserted into one of the multiple slots to select one of the plurality of predetermined volumes of liquid, and wherein each slot corresponds to one of the plurality of predetermined volumes of liquid.

24. The storage device of claim 23, wherein the liquid is a medicine, wherein a first predetermined volume of liquid corresponds to an adult dosage, and wherein a second predetermined volume of liquid corresponds to a child dosage.

* * * * *

UNITED STATES PATENT AND TRADEMARK OFFICE
CERTIFICATE OF CORRECTION

PATENT NO.        : 8,863,996 B2
APPLICATION NO.   : 13/395839
DATED             : October 21, 2014
INVENTOR(S)       : Mishra It is certified that error appears in the above-identified patent and that said Letters Patent is hereby corrected as shown below:

On the Title Page,

On Page 2, item (56), under "OTHER PUBLICATIONS", in Column 2, Line 16, delete "custorn/" and insert -- custom/ --, therefor.

On Page 2, item (56), under "OTHER PUBLICATIONS", in Column 2, Line 23, delete "-packqing-" and insert -- -packaging- --, therefor.

In the Specification,

In Column 1, Lines 7-8, delete "stage application claiming the benefit of International" and insert -- stage filing under 35 U.S.C. §371 of International --, therefor.

In Column 1, Line 20, delete "Theft" and insert -- These --, therefor.

In Column 2, Line 42, delete "prohibited," and insert -- prohibited --, therefor.

In Column 3, Line 40, delete "across-sectional" and insert -- a cross-sectional --, therefor.

In Column 6, Line 12, delete "wail 170" and insert -- wall 170 --, therefor.

In Column 7, Line 10, delete "fill" and insert -- full --, therefor.

In Column 8, Line 22, delete "call be" and insert -- can be --, therefor.

In Column 8, Line 40, delete "flowing," and insert -- flowing --, therefor.

In Column 8, Line 57, delete "4e" and insert -- 4c --, therefor.

Signed and Sealed this
Fourteenth Day of April, 2015

Michelle K. Lee
*Director of the United States Patent and Trademark Office*

CERTIFICATE OF CORRECTION (continued)
U.S. Pat. No. 8,863,996 B2

In Column 8, Line 62, delete "first" and insert -- a first --, therefor.

In Column 10, Line 36, delete "stomp" and insert -- storage --, therefor.

In Column 11, Line 16, delete "storage chamber 130" and insert -- storage chamber 110 --, therefor.

In Column 11, Line 33, delete "architect ate" and insert -- architectures are --, therefor.

In Column 11, Line 62, delete "the tam" and insert -- the term --, therefor.

In the Claims,

In Column 14, Line 20, in Claim 19, delete "a the" and insert -- a --, therefor.